April 19, 1960    H. W. TREVASKIS ET AL    2,933,162
BRAKE DISCS
Filed Sept. 24, 1957    2 Sheets-Sheet 1
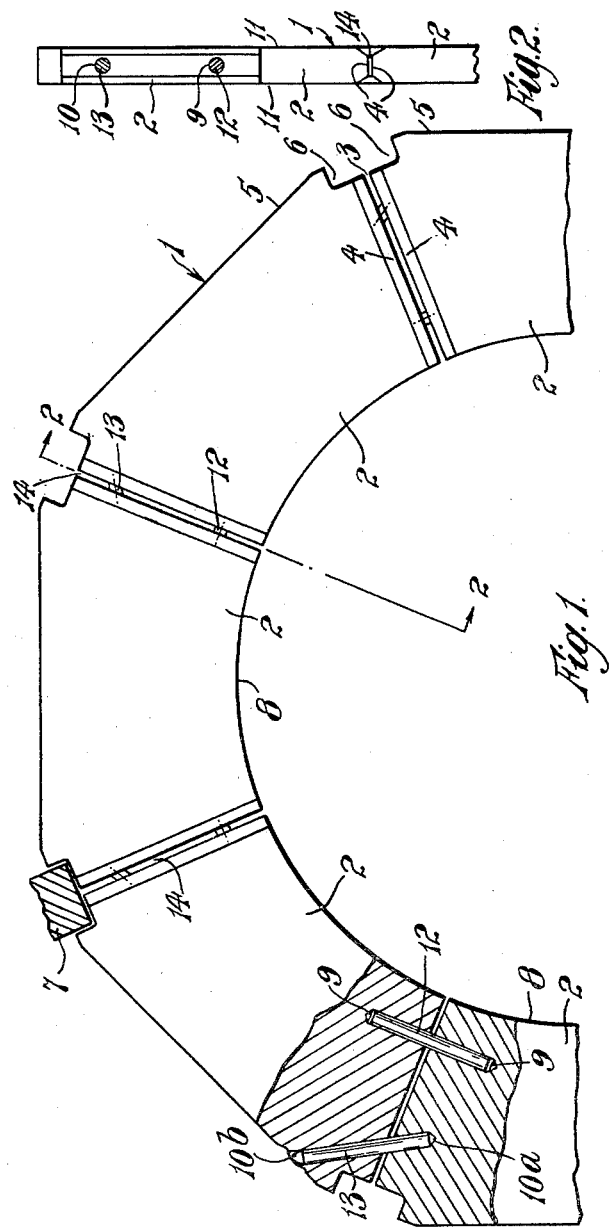
INVENTORS
Henry William Trevaskis
Frederick James Knight
by Benj. T. Rauber
their attorney April 19, 1960   H. W. TREVASKIS ET AL   2,933,162
BRAKE DISCS
Filed Sept. 24, 1957    2 Sheets-Sheet 2
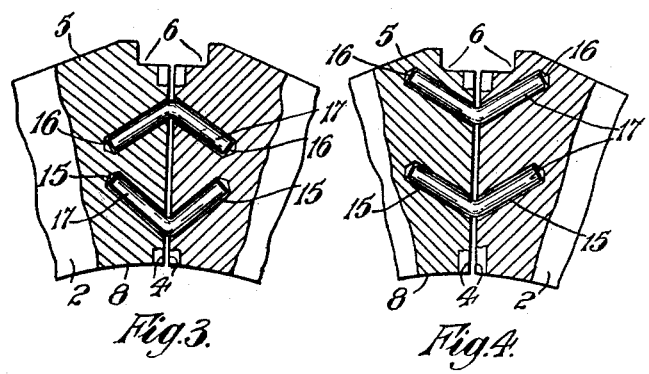
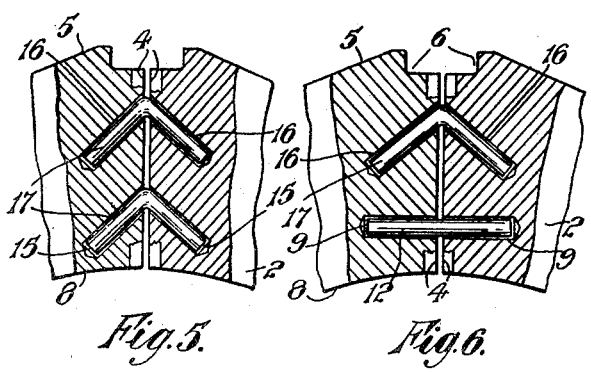
INVENTORS
Henry William Trevaskis
Frederick James Knight
by Benj. T. Lauber
their attorney

United States Patent Office 2,933,162
Patented Apr. 19, 1960

2,933,162
BRAKE DISCS

Henry William Trevaskis, Point Pleasant Blackdown, near Leamington Spa, and Frederick James Knight, Coventry, England, assignors to Dunlop Rubber Company Limited, London, England, a British company Application September 24, 1957, Serial No. 685,917

Claims priority, application Great Britain September 29, 1956

13 Claims. (Cl. 188—218)

This invention relates to disc brakes and more particularly to disc brakes of the type in which the disc is operatively connected to the wheel, axle or other rotatable part, the rotation of which it is adapted to retard, in such a manner as to be axially slidable in relation thereto.

Brakes of this general type fall within two main classes which comprise, on the one hand, "spot" brakes in which the means for retarding the rotation of the disc comprise a friction pad or pads of segmental or other shape which are adapted to engage only a minor portion of the radial faces of the disc, and, on the other hand, that class of brake in which an annulus, or a plurality of segmental or other shaped annularly-arranged pads, engages the radial faces of the disc throughout the circumference of the disc at the zone of contact. It is to the latter class of disc brake that the present invention is particularly related.

In the operation of disc brakes, great heat is generated by the friction between the rotating disc and the associated friction means during the torque-absorbing contact therebetween, and this heat is sufficiently intense at times to cause the rotating disc to warp and assume a concave or convex form, or to cause undulations and other irregularities to appear in its radial surfaces. These aberrations all have a deleterious effect upon the efficiency of the brake and are to be avoided.

It has been proposed to form the disc of such a brake from a series of conjoined segments inter-connected along their radial sides so as to have a limited movement in respect to each other, and to mount the resultant multipart disc to be driven by the rotating part. However, discs previously so constructed are subject to centrifugal forces which tend to throw the segments radially outwardly of the wheel, axle or the like and so to increase the peripheral circumference of the disc to such an extent that allowance for this increase in size must be made in the initial design of the brake to enable it to be installed within the wheel space available. Where the disc is axially slidable on splines or keys engaging its outer periphery, the centrifugally-induced increase in diameter is particularly disadvantageous as this causes the disc to tend to bed or bind upon the said splines, or keys, and thus make the actuation of the brake more difficult.

The object of the present invention is to overcome the above disadvantages in a novel form of segmental brake disc wherein the adjacent radial sides of the plurality of segments are joined in a manner which substantially inhibits any radial movement of the individual segments as the result of centrifugal forces.

According to the present invention, a brake disc for a disc brake compriess a plurality of metallic segments mutually associated to form an annular disc, means formed in or on the periphery of said disc to enable the disc to slide axially relative to, and to be driven by, a rotatable part of a mechanism to be braked, said segments being interconnected by pins each of which has its opposite ends adapted to be received in co-operating holes formed in the adjoining radial sides of adjacent segments, said holes being disposed substantially midway of, and parallel to, the plane surfaces of the disc and at least one of the holes in each radial side being angularly-disposed relative to said side, at an angle other than a right angle.

The invention also includes disc brakes provided with such discs.

A better understanding of the invention may be had from the following description when it is read with reference to the accompanying drawings, of which:

Figure 1 is an elevation, partly in section, of one diametrical half of a brake disc constructed according to the invention, Figure 2 is a section on the line 2—2 of Figure 1 and Figures 3 to 6 are views of a portion of Figure 1 showing alternative forms of segment-connecting means.

As shown in Figures 1 and 2 of the drawings, the disc 1 comprises eight segments 2 each of which is an identical ring segment of the normal radial width for the particular brake disc. At the junction 3 of each radial side 4 of each segment 2 with its outer peripheral surface 5 a suitable recess 6 is formed to engage with a spline or key 7 formed in the brake recess of the wheel with which the brake is to be associated. This recess 6 is of such size that when adjacent segments 2 are brought together in their operative relationship the recesses 6 on the adjacent edges together form a recess which is freely slidable on the said key or spline 7. Thus when assembled, as will be described, the segmented disc 1 may be associated with a wheel or the like so that it is rotated thereby but is free to slide axially on the keys or splines 7 during engagement or disengagement of the brake. The radially-inner peripheral edge 8 of each segment 6 is concave in form, the degree of concavity being such that when the radial sides 4 of the segments are brought into abutment, the inner peripheral edges 8 together describe a circle which comprises the inner periphery of the annular disc 1.

In each radial side 4 of each segment 2 two radially-spaced holes 9, 10 are drilled, the radially-innermost holes 9 being disposed substantially at right-angles to each radial edge 4 of the segment 2 and passing into the mass thereof substantially midway between, and parallel to, the opposite plane surfaces 11 of the segment 2, as will be seen in Figure 2.

The radially-outermost holes 10 in each pair of adjacent radial sides 4 of the adjacent segments 2 are formed at an angle to the said radial edges, said angle being substantially greater or lesser than a right angle; the hole 10a in one radial side 4 being directed generally towards the inner peripheral edge 8 of the segment 2 and the hole 10b in the adjacent radial side 4 of the adjacent segment 2 being directed outwardly towards, and through, the outer peripheral edge 5 of the segment. When the adjacent segments 2 are brought into radial abutment, the radially-innermost holes 9 in each abutting radial side 4 form a continuous straight passage disposed at right angles to the abutting radial edges 4, and the radially-outermost holes 10 form another straight passage extending through the outer peripheral edge 5 of one segment 2 and passing into the adjacent segment 2 at an acute angle to the abutting radial sides 4.

In assembling the plurality of segments 2 into a complete segmented disc 1, the drilled segments are disposed in a circle, the periphery of which is in excess of the periphery of the assembled disc 1, and the adjacent radial sides 4 of the individual segments 2 thus being widely separated.

A plurality of straight metal pins 12 are engaged in the co-operating mouths of adjacent radially-inner holes 9 and the plurality of segments 2 is then pressed radially inwards until the radial sides of the segments abut and the pins 12 are received in their holes 9. A further pin 13 is then passed into each radially-outer hole 10b in adjacent segments 2, through the mouth of the hole in the outer peripheral edge 5 thereof and the pins 13 are retained in these holes by peening or otherwise closing or restricting the opening defining the said mouth as shown in Fig. 1.

It is preferred that the radial edges should not be in complete abutment but that a small radially-extending space 14 should be left between each pair of segments to allow for circumferential expansion of the segments 2 due to the heat produced in braking, the provision of such expansion space 14 greatly minimising distortion of the assembled disc and limiting the circumferential enlargement of the disc due to heat expansion.

Due to the location of the pins 12, 13 in their respective holes, peripheral enlargement of the disc 1 due to centrifugal forces is substantially prevented, the radially-outermost pin 13 in each pair of cooperating radial sides 4 acting as a positive lock against such peripheral enlargement while still providing a sufficient degree of axial flexibility to enable the disc 1 to accommodate itself to temporary minor misalignments of the braking parts under operational conditions.

In further embodiments of the invention, as shown in Figures 3 to 5, the segments 2 are similar in shape and number to those in the preferred embodiment of the invention, each segment being provided with a peripheral recess 6 for engagement with a spline or key 7 formed in the brake recess of the vehicle wheel.

In each radial side 4 of each ring segment 2 one or more holes 15, or 16 are drilled medially of, and parallel to, the opposite plane surfaces of the segment, these holes being of substantial depth and being directed at a substantial angle to the said radial side 4 so that their general direction is inclined either to the inner or outer peripheral edge 8 or 5 of the segment 2. More than one such hole 15, 16 may be drilled in each radial side 4, and they may all be directed in the same angular relationship to the radial side 4, or some may be drilled in the opposite angular sense to the others. The holes 15 or 16 in adjacent radial sides 4 of adjacent segments 2 are so positioned as to co-operate when the segments are brought into side-by-side abutment, and each co-operating pair of holes 15, 16 is formed in the same angular direction so that when the segments 2 are brought into side-by-side abutment each co-operating pair of holes 15, 16 defines a V which may be either normal or inverted, dependent upon the angular direction of the holes.

In assembling the plurality of segments 2 into a complete segmented disc 1 according to this embodiment of the invention, the segments 2 are disposed in a circle of greater diameter than that of the assembled disc 1, with the adjacent radial sides 4 widely separated, as in the previously-described embodiment of the invention.

A plurality of straight metal pins or pegs 17, of a diameter somewhat less than that of the holes 15, 16 in the radial sides 4 of the segments, is disposed each with one of its opposite ends engaged in the mouth of one of the co-operating holes 15 or 16 in the adjacent segments, and the whole of the segments 2 are then simultaneously pressed radially-inwardly towards the axial center of the disc 1 until their adjacent radial sides 4 are brought into substantial abutment.

As the segments 2 are pressed radially inwards the pins or pegs 17 are forced into the co-operating holes 15 or 16 and are deformed into a V-shape, thus locking together the adjacent segments 2, which cannot be separated either mechanically or by centrifugal forces, except upon further deformation of the pins or pegs 17 into their original shape.

It is to be understood that the pins 16 and 17 used in these modifications are not of hard or hardened steel but of metal which can be readily bent. The segments are brought to position for assembly arranged to form a circle or polygon of larger diameter than that of the assembled brake disc so that the radially extending sides or edges are spaced sufficiently to permit the pins to be normal to the radii and with their ends in the opposed open ends of the holes 15 and 16. As the segments are moved inwardly toward the center the pins are bent at an angle decreasing from 180° to the angle formed by the holes 15 or 16. This bending may be done by any suitable means simultaneously with the inward movement of the segments. Once the segments have been assembled to their final dimensions the pins can not be bent back by centrifugal action as this force is not sufficient to bend back the pins as this would require a progressive straightening from the apex of the angle to the ends of the pins. This would require a much greater force than merely to bend them from a straight line to an angle at the apex as in assembling the disc. Moreover the centrifugal force is limited whereas the bending force on the pins may be increased to that required for bending the pins to an angle.

The co-operating pairs of holes in the adjacent radial edges of the segments need not necessarily be directed in the same sense, and it may at times be preferred that where two or more pairs of holes 15, 16 are provided at least one pair, as shown in Figure 3, shall define a V and the other pair shall define an inverted V.

In still a further embodiment of the invention, as shown in Figure 6, one straight pin 12 may be combined with a pin 17 deformed into V shape. The holes 16 in this case may be directed to either the inner or outer periphery of the disc, and the straight pin 12 may be either radially-innermost or radially-outermost.

In all embodiments of the invention, due to the fact that the pins or pegs are a loose fit in the holes, a certain amount of axial "play" or looseness is permitted between adjacent segments in the completed disc, this looseness permitting a desirable flexibility in the disc to permit it to follow the friction pads during minor misalignments of the brake parts that may be encountered under operational conditions. The disposition of the holes and pins, however, successfully resists centrifugal forces, and the segments cannot be thrown radially outwards to increase the diameter of the disc except upon actual physical deformation of the locking pins or pegs, which are of a size and gauge sufficient to resist any such forces that may be applied during the operation of the brakes.

The invention is equally applicable to brake discs driven from their inner periphery and axially-slidable upon an axle or axle boss or upon any similar drive-transmitting shaft.

Having now described our invention, what we claim is:

1. A brake disc for disc brakes comprising a plurality of metallic segments having radial sides and being mutually associated to form an annular disc, said segments having means formed at the periphery of the disc to enable the disc to slide axially relative to and to be driven by a rotatable part of a mechanism to be braked, each of said segments having holes formed in each of the adjoining radial sides the holes of each segment mating with respective holes of adjacent pairs with the outer ends of adjacent holes aligned, said holes being disposed substantially midway of and parallel to the plane surfaces of the disc and at least one of the holes in each radial side being disposed at an angle other than a right angle to said side, and pins interconnecting adjacent segments, each pin being partly in the hole of one segment and partly in the hole of an adjacent segment, said pins having a loose fit in said holes to permit flexibility of the disc laterally but to hold said discs from moving radially outwardly.

2. A brake disc according to claim 1 wherein two said holes are formed in each said radial side.

3. A brake disc according to claim 1 wherein the radially-innermost hole in each said radial side is formed at a right angle to said side.

4. A brake disc according to claim 1 wherein the radially-outermost hole in each said radial side is formed at an angle other than a right-angle to said side.

5. A brake disc according to claim 4 wherein the radially-outermost holes in each pair of said sides are formed in opposite angularity relative to each of said sides whereby when said adjacent radial sides are brought into abutment said holes are adapted to co-operate to form a continuous straight passage disposed at an angle other than a right-angle to said abutting sides, the radially-outer portion of said passage extending through the outer peripheral edge of said segment.

6. A brake disc according to claim 4 wherein the radially-outermost holes in each pair of said sides are formed in the same angularity relative to each of said sides, whereby when said radial sides are brought into abutment said holes are adapted to co-operate to form a V-shaped passage one half of which is located in each of the abutting segments.

7. A brake disc according to claim 6 wherein the apex of said V is directed towards the inner periphery of said disc.

8. A brake disc according to claim 6 wherein the apex of said V is directed towards the outer periphery of said disc.

9. A brake disc according to claim 4 wherein the radially-innermost hole in each said radial side is formed at an angle to the said side.

10. A brake disc according to claim 9 wherein the radially-innermost holes in each pair of said sides are formed in the same angularity relative to each of said sides whereby when said adjacent radial sides are brought into abutment said holes are adapted to co-operate to form a V-shaped passage one half of which is located in each of the abutting segments.

11. A brake disc according to claim 10 wherein the apex of said V is directed towards the inner periphery of said disc.

12. A brake disc according to claim 11 wherein the apex of said V is directed towards the outer periphery of said disc.

13. A brake disc according to claim 5 wherein the mouth of said passage at the outer periphery of said disc is closed sufficiently to prevent withdrawal of said pin.

References Cited in the file of this patent

UNITED STATES PATENTS

| | | |
|---|---|---|
| 863,650 | Rockwell | Aug. 20, 1907 |
| 2,144,831 | Burns | Jan. 24, 1939 |
| 2,328,823 | MacKenzie | Sept. 7, 1943 |
| 2,423,882 | Frank | July 15, 1947 |
| 2,531,696 | Martin | Nov. 28, 1950 |
| 2,610,719 | Hornbostel | Sept. 16, 1952 |

FOREIGN PATENTS

| | | |
|---|---|---|
| 114,547 | Sweden | July 17, 1945 |